US011526957B2

(12) United States Patent
Ohtani et al.

(10) Patent No.: US 11,526,957 B2
(45) Date of Patent: Dec. 13, 2022

(54) INFORMATION PROCESSING APPARATUS, INFORMATION PROCESSING METHOD, AND PROGRAM

(71) Applicant: TOYOTA JIDOSHA KABUSHIKI KAISHA, Toyota (JP)

(72) Inventors: Fumiki Ohtani, Toyota (JP); Hirofumi Kamimaru, Fukuoka (JP); Riho Matsuo, Nagoya (JP); Shodai Kato, Toyota (JP); Atsushi Yoshida, Tokyo-to (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 740 days.

(21) Appl. No.: 16/435,653

(22) Filed: Jun. 10, 2019

(65) Prior Publication Data
US 2020/0005419 A1 Jan. 2, 2020

(30) Foreign Application Priority Data
Jun. 29, 2018 (JP) .............................. JP2018-124223

(51) Int. Cl.
*G06Q 50/30* (2012.01)
*G05D 1/02* (2020.01)
(Continued)

(52) U.S. Cl.
CPC ........... *G06Q 50/30* (2013.01); *G05D 1/0276* (2013.01); *G08G 1/096838* (2013.01);
(Continued)

(58) Field of Classification Search
CPC .. G06Q 50/30; G06Q 10/06316; G06Q 50/01; G06Q 2240/00; G05D 1/0276;
(Continued)

(56) References Cited

U.S. PATENT DOCUMENTS

| 10,152,053 B1* | 12/2018 | Smith | G06Q 10/08 |
| 2017/0351990 A1* | 12/2017 | Hecht | G06Q 50/01 |
| 2017/0365030 A1* | 12/2017 | Shoham | G08G 1/202 |

FOREIGN PATENT DOCUMENTS

| CN | 105894594 A | 8/2016 |
| JP | 2001-229495 A | 8/2001 |

OTHER PUBLICATIONS

Shivers, Ryan, et al. "Ride-hailing for autonomous vehicles: Hyperledger fabric-based secure and decentralize blockchain platform." 2021 IEEE International Conference on Big Data (Big Data). IEEE, 2021. (Year: 2021).*

* cited by examiner

Primary Examiner — Sharad Rampuria
(74) Attorney, Agent, or Firm — Oliff PLC

(57) ABSTRACT

An information processing apparatus executes: acquiring whether or not a first user permits another user to ride in a first vehicle; acquiring whether or not a second user is matched with each of vehicles; regarding, as the first vehicle, a vehicle which is among the vehicles and with which the second user is not matched, and matching the first vehicle with the first user, when the first user requests a ride in the first vehicle and does not permit another user to ride in the first vehicle; and not permitting the other user to be matched with the first vehicle, after matching the first user with the first vehicle.

5 Claims, 15 Drawing Sheets

(51) Int. Cl.
*H04W 4/44* (2018.01)
*G08G 1/0968* (2006.01)
*H04W 4/024* (2018.01)

(52) U.S. Cl.
CPC ...... *G08G 1/096844* (2013.01); *H04W 4/024* (2018.02); *H04W 4/44* (2018.02)

(58) Field of Classification Search
CPC ....... G08G 1/096838; G08G 1/096844; G08G 1/005; G08G 1/202; H04W 4/024; H04W 4/44; H04L 51/32; H04L 67/12; G07B 15/00; G07C 1/30; G07F 17/24
See application file for complete search history.

| USER ID (DRIVER) | VEHICLE NUMBER | DEPARTURE POINT | SCHEDULED DEPARTURE TIME | DESTINATION POINT |
|---|---|---|---|---|
| S001 | ... | d | 18:00 | e |
| S002 | ... | d | 18:10 | e |
| | | | | |

Fig. 5

| USER ID (PASSENGER) | DEPARTURE POINT | DESIRED DEPARTURE TIME | DESTINATION POINT | DESIRED ARRIVAL TIME | CO-RIDING OF ANOTHER USER |
|---|---|---|---|---|---|
| C001 | f | 18:00 | g | 18:50 | PERMITTED |
| C002 | h | 18:30 | g | 18:50 | PERMITTED |
| | | | | | |

Fig. 6

| USER ID (DRIVER) | USER ID (PASSENGER) | VEHICLE NUMBER | DRIVER DEPARTURE POINT AND SCHEDULED DEPARTURE TIME | PASSENGER DEPARTURE POINT AND SCHEDULED DEPARTURE TIME | PASSENGER DESTINATION POINT | DRIVER DESTINATION POINT |
|---|---|---|---|---|---|---|
| S001 | C001 | ... | d 18:00 | f 18:10 | g | |
| | C002 | | | h 18:30 | g | e |
| S002 | | ... | d 18:10 | | | e |

Fig. 7

| USER ID (PASSENGER) | DEPARTURE POINT | DESIRED DEPARTURE TIME | DESTINATION POINT | DESIRED ARRIVAL TIME | CO-RIDING OF ANOTHER USER |
|---|---|---|---|---|---|
| C003 | f | 18:10 | g | 18:50 | DENIED |

Fig. 8

| USER ID (DRIVER) | USER ID (PASSENGER) | VEHICLE NUMBER | DRIVER DEPARTURE POINT AND SCHEDULED DEPARTURE TIME | PASSENGER DEPARTURE POINT AND SCHEDULED DEPARTURE TIME | PASSENGER DESTINATION POINT | DRIVER DESTINATION POINT |
|---|---|---|---|---|---|---|
| S001 | C001 | ... | d 18:00 | f 18:10 | g | |
| | C002 | | | h 18:30 | g | e |
| S002 | C003 | ... | d 18:10 | f 18:20 | g | e |

Fig. 9

INFORMATION PROCESSING APPARATUS, INFORMATION PROCESSING METHOD, AND PROGRAM

CROSS REFERENCE TO RELATED APPLICATION

This application claims priority to Japanese Patent Application No. 2018-124223, filed on Jun. 29, 2018, which is hereby incorporated by reference herein in its entirety.

BACKGROUND

Technical Field

The present disclosure relates to an information processing apparatus, an information processing method, and a program.

Description of the Related Art

A travel mode where multiple users ride with each other in the same vehicle has been known (for example, see Patent document 1).

CITATION LIST

Patent Document

[Patent document 1] U.S. Patent Application Publication No. 2017/0351990

SUMMARY

The present disclosure has an object to provide an information processing apparatus, an information processing method, and a program that can provide a user-friendly traffic mode, among traffic modes where multiple users ride in the same vehicle and travel.

One aspect of the present disclosure is an information processing apparatus applied to a traffic mode where a user rides in one vehicle among predefined vehicles and travels, comprising a controller executing: acquiring whether or not a first user permits another user to ride in a first vehicle that is the one vehicle where the first user is scheduled to ride; acquiring whether or not a second user having requested a ride in the vehicle is matched with each of the vehicles; regarding, as the first vehicle, a vehicle which is among the vehicles and with which the second user is not matched, and matching the first vehicle with the first user, when the first user requests a ride in the first vehicle and does not permit another user to ride in the first vehicle; and not permitting the other user to be matched with the first vehicle, after matching the first user with the first vehicle.

The aspects of the present disclosure include an aspect of a method and an aspect of a program that correspond to the information processing apparatus described above.

The present disclosure can provide a user-friendly traffic mode among the traffic modes where multiple users ride in the same vehicle and travel.

BRIEF DESCRIPTION OF THE DRAWINGS

FIG. 5 depicts an example of a schedule information table;

FIG. 6 depicts an example of a request information table;

FIG. 7 depicts an example of a matching information table;

FIG. 8 depicts an example of a request information table;

FIG. 9 depicts an example of a matching information table;

DESCRIPTION OF THE EMBODIMENTS

An information processing apparatus that is an embodiment of the present disclosure sets a combination of a first user and a first vehicle where the first user is scheduled to ride, on the basis of whether the first user permits another user to ride together in the first vehicle. That is, the first user and the first vehicle are matched with each other.

Here, the first user sometimes hesitates to share the vehicle space with a user other than the driver of the vehicle. Accordingly, when the first user does not permit the other user to ride in the first vehicle, a controller regards a vehicle with which a second user is not matched, as the first vehicle where the first user is scheduled to ride, and matches the first vehicle with the first user. Furthermore, after the controller matches the first user with the first vehicle, this unit does not permit the other user to be matched with the first vehicle. The second user is a user who has requested to ride in the vehicle that is any of vehicles predefined as vehicles provided for a traffic mode according to the present disclosure, and is not the driver of the vehicle.

Accordingly, when the controller matches the first user with the first vehicle, except the driver, the user scheduled to ride in the first vehicle is only the first user (in a case where the first vehicle is an autonomous mobile body, the user scheduled to ride in the first vehicle is only the first user). Accordingly, in a process of movement of the first user by the first vehicle, a situation does not occur where the first user shares the vehicle space with users other than the driver of the first vehicle. As a result, a user hesitating to share the vehicle space is facilitated to use the traffic mode according to the present disclosure. That is, the information processing apparatus according to the present disclosure can provide the user-friendly traffic mode.

Hereinafter, specific embodiments of the present disclosure are described with reference to the drawings. The dimensions, materials, shapes, relative arrangements and the like of the configuration components described in the embodiments do not intend to limit the technical scope of the disclosure thereto, unless specifically described.

First Embodiment (Overview of Matching System)

Figure 1:
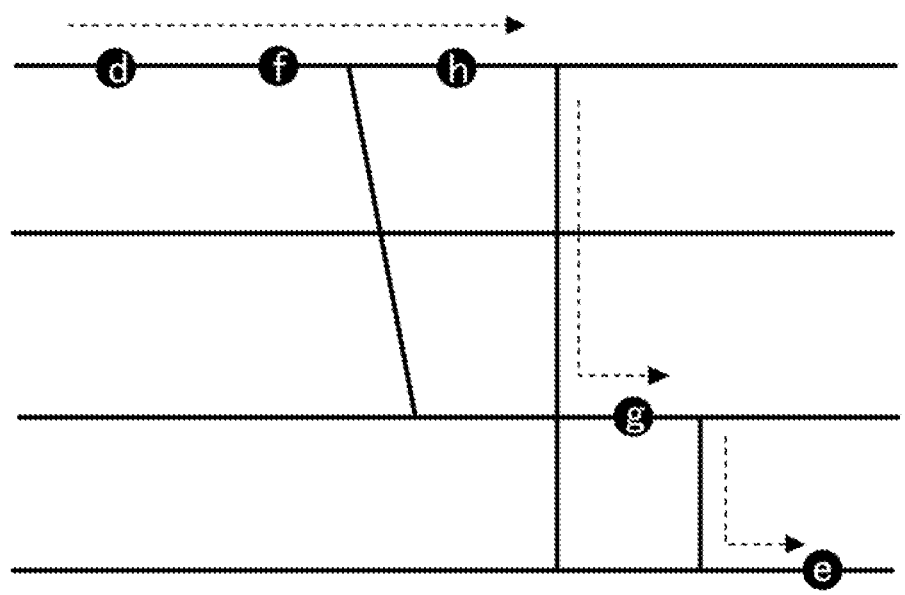
FIG. 1 is a diagram for illustrating a rideshare.

FIG. 1 is a diagram for illustrating rideshare that is a traffic mode where users move while riding with each other. In FIG. 1, a user A moves from a departure point d to a destination point e, a user B moves from a departure point f to a destination point g, and a user C moves from a departure point h to a destination point e.

Here, if the users A to C separately move to the destination points, three vehicles are to be used. On the contrary, if the users A to C ride with each other, movement to the destinations is allowed by one vehicle. In an example depicted in FIG. 1, the user A serves as a driver of the vehicle, and moves the vehicle from the point d to the point e. In this case, the user A allows the user B to ride in his/her driving vehicle at the point f, and allows the user C to ride in his/her driving vehicle at the point h. The user A then passes through the point g at the middle of moving the vehicle to the point e, which is the destination point of him/her and the user C, and allows the user B to get off the vehicle at the point g, thereby enabling the user B to move from the departure point f to the destination point g. Furthermore, the user A moves the vehicle to the point e, which can move the user C from the departure point h to the destination point e and complete his/her movement.

Such rideshare can reduce the number of vehicles traveling on roads, which can reduce traffic jams. Furthermore, for example, the transportation cost (including the fuel cost etc.) used for movement using a vehicle is shared and afforded (cost sharing) among the users of the vehicle, thereby allowing the transportation cost per user to be reduced in comparison with a case where the users separately move in different vehicles.

However, for instance, in the example depicted in FIG. 1, the user B sometimes hesitates to ride with the user C. In a case of presence of a user hesitating to share the vehicle space with another user, rideshare can be a traffic mode inaccessible for the user.

Here, in a matching system according to this embodiment, a server apparatus sets a combination between a first user and a vehicle where the first user is scheduled to ride (hereinafter, sometimes called "first vehicle"). That is, this system matches the first user with the first vehicle. In detail, when the first user does not permit another user who is not a driver of the first vehicle, where the first user intends to ride, the server apparatus regards a vehicle with which an after-mentioned second user is not set, as the first vehicle, and combines the first vehicle with the first user.

(System Configuration)

Figure 2:
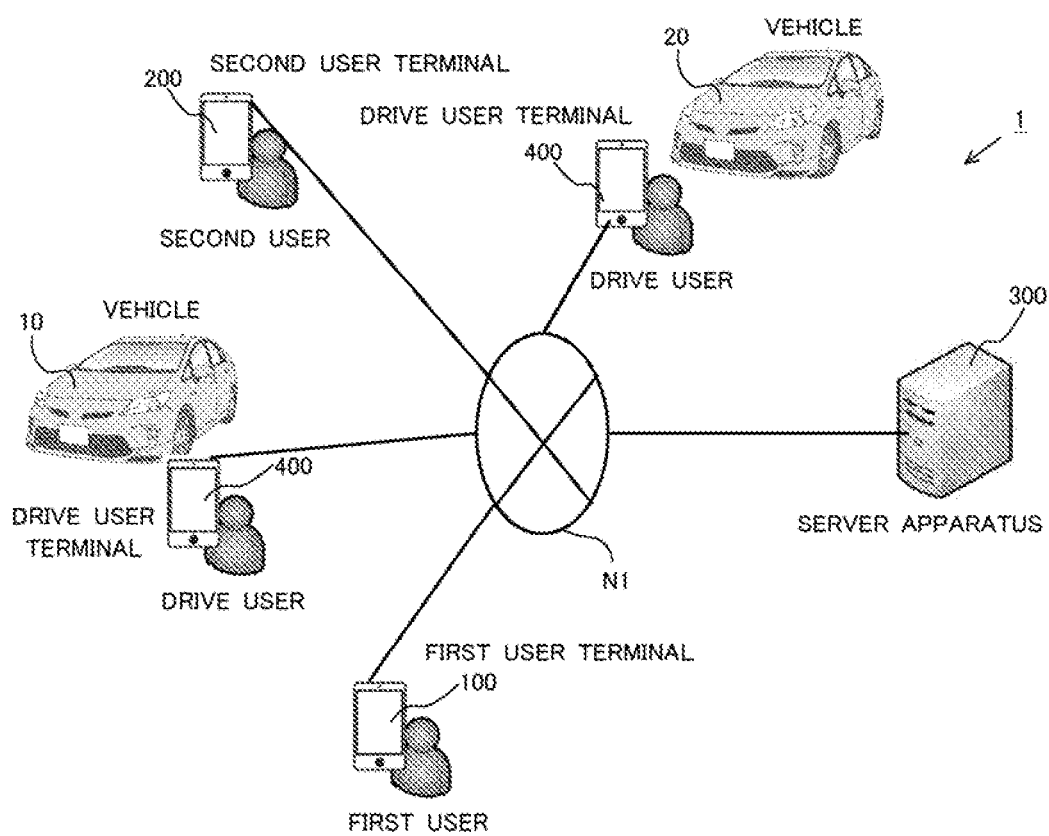
FIG. 2 is a diagram depicting the schematic configuration of a matching system according to a first embodiment.

FIG. 2 is a diagram depicting the schematic configuration of the matching system according to this embodiment. In the example in FIG. 2, the matching system 1 includes a vehicle 10, a vehicle 20, a first user terminal 100 that is a terminal owned by the first user, a second user terminal 200 that is a terminal owned by the second user, a server apparatus 300, and a drive user terminal 400 that is a terminal owned by a drive user who drives the vehicle. The first user terminal 100, the second user terminal 200, the server apparatus 300, and the drive user terminal 400 are connected to each other by a network N1. In this embodiment, the first user and the second user are users riding together in the vehicle that the drive user drives. As described later, the first user is a user who does not permit another user, except the drive user, to ride together in the first vehicle where the first user rides. The second user is a user who has requested a ride in the vehicle provided for rideshare and is not a driver of the vehicle.

The server apparatus 300 accepts a registration of information from the user who uses rideshare. Identification information related to the user and information on the vehicle provided for rideshare are registered in the server apparatus 300. The user riding in any vehicle registered in the server apparatus 300 can register information indicating a request for a ride in a vehicle (hereinafter, request information) using the user terminal. Note that the user can register the request information through an application installed in the user terminal for using a rideshare service (hereinafter, sometimes called "predetermined application"), for example. However, there is no intention of limitation to the mode of registering the request information using the user terminal. The request information may be registered using any terminal connectable to the network N1 (a smartphone, a mobile phone, a tablet terminal, a personal information terminal, a wearable computer or the like) or a personal computer (PC). The identification information related to the user, and the information on the vehicle provided for rideshare are preliminarily registered by the predetermined application.

The server apparatus 300 accepts registration of a vehicle traveling schedule (hereinafter, schedule information) from the drive user, with respect to each vehicle provided for rideshare. The drive user can register the schedule information through a predetermined application using the drive user terminal 400. However, there is no intention of limitation to the embodiment of registering the schedule information using the drive user terminal 400.

The server apparatus 300 then matches a predetermined vehicle registered in the server apparatus 300 with the user scheduled to ride in the vehicle, on the basis of the request information and the schedule information. At this time, the server apparatus 300 acquires permissibility information from the user, described later. When the permissibility information permits another user to ride together, this apparatus performs the matching described above, on the basis of a well-known method. On the contrary, when the permissibility information does not permit another user to ride together, the server apparatus 300 regards, as the first vehicle, a vehicle with which the second user is not matched, and matches the first vehicle with the first user. This is described later in detail.

(Hardware Configurations)

Figure 3:
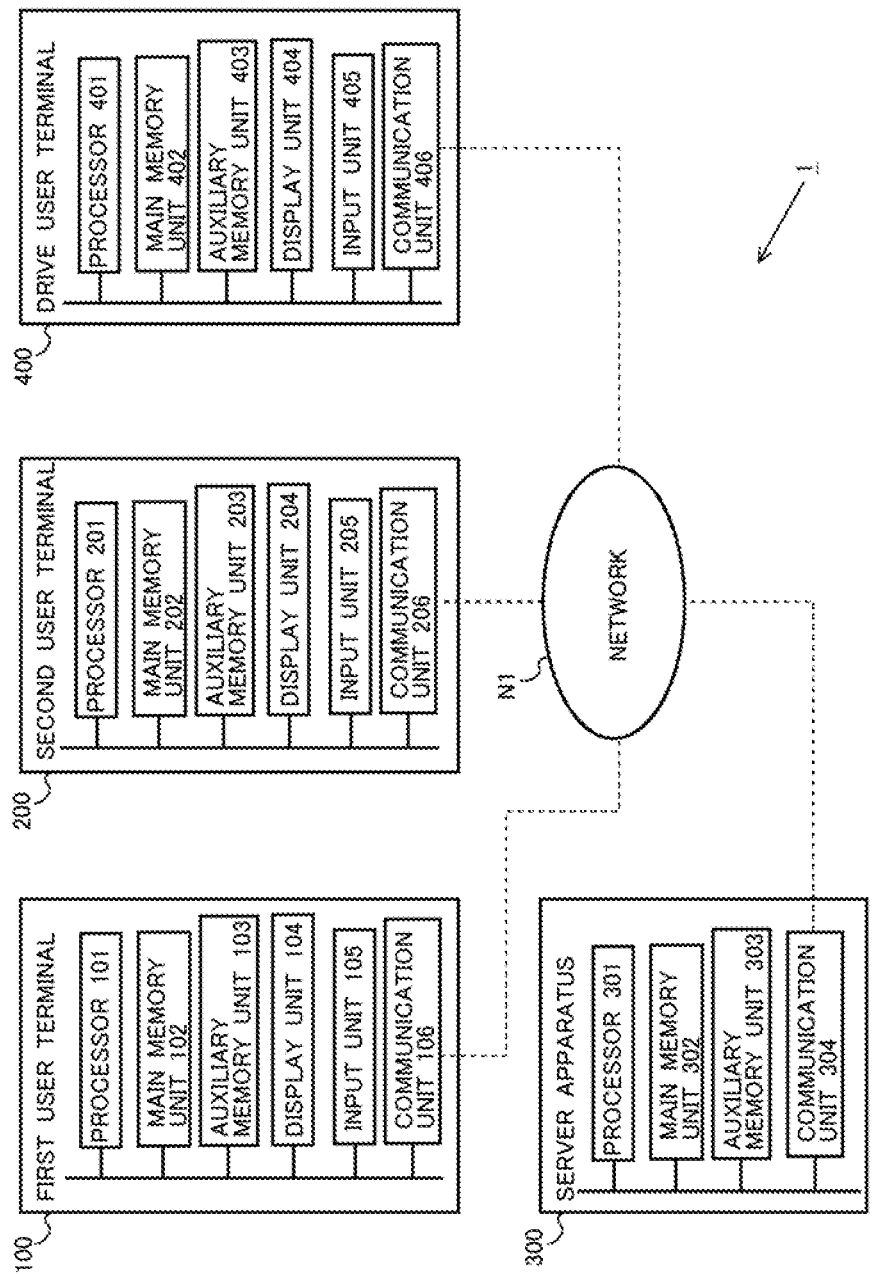
FIG. 3 is a diagram exemplifying each of hardware configurations of a first user terminal, a second user terminal, a server apparatus, and a drive user terminal in the matching system.

FIG. 3 is a diagram exemplifying each of hardware configurations of the first user terminal 100, the second user terminal 200, the server apparatus 300, and the drive user terminal 400.

First, the server apparatus 300 is described. The server apparatus 300 has the configuration of a typical computer. The server apparatus 300 includes a processor 301, a main memory unit 302, an auxiliary memory unit 303, and a communication unit 304. These are connected to each other by a bus. The main memory unit 302 and the auxiliary memory unit 303 are computer-readable recording media. The hardware configuration of the computer is not limited to the example depicted in FIG. 3. The components may be appropriately omitted replaced or added.

The server apparatus 300 causes the processor 301 to load a program stored in the recording medium into a work area of the main memory unit 302 and execute the program, and to control each functional component and the like through execution of the program, thereby allowing a function satisfying a predetermined object to be achieved.

The processor 301 is, for example, a CPU (Central Processing Unit) or a DSP (Digital Signal Processor). The processor 301 controls the server apparatus 300 to perform the operation of various information processes. The main memory unit 302 includes, for example, a RAM (Random Access Memory) and a ROM (Read Only Memory). The auxiliary memory unit 303 is, for example, an EPROM (Erasable Programmable ROM), or a hard disk drive (HDD). The auxiliary memory unit 303 may include a removable medium, i.e., a removable recording medium. The removable medium is, for example, a disk recording medium, such as a USB (Universal Serial Bus) memory or a CD (Compact Disc) or a DVD (Digital Versatile Disc).

The auxiliary memory unit 303 stores various programs, various data items and various tables, in the recording medium, in a readable and writable manner. The auxiliary memory unit 303 stores an operating system (OS), various programs, various tables, etc. The information stored in the auxiliary memory unit 303 may be stored in the main memory unit 302. Furthermore, the information stored in the main memory unit 302 may be stored in the auxiliary memory unit 303.

The communication unit 304 is connected to another apparatus, and controls communication between the server apparatus 300 and the other apparatus. The communication unit 304 is, for example, a LAN (Local Area Network) interface board, or a wireless communication circuit for wireless communication. The LAN interface board or the wireless communication circuit is connected to the network N1, such as the Internet, which is a public communication network.

A series of processes executed by the server apparatus 300 can be executed by hardware, but can be executed by software instead.

Next, the first user terminal 100 is described. The first user terminal 100 is, for example, a small computer, such as a smartphone, a mobile phone, a tablet terminal, a personal information terminal, or a wearable computer (a smartwatch etc.). Note that the first user terminal 100 may be a personal computer (PC) that is connected to the server apparatus 300 via the network N1, such as the Internet, which is a public communication network.

The first user terminal 100 includes a processor 101, a main memory unit 102, an auxiliary memory unit 103, a display unit 104, an input unit 105, and a communication unit 106. The processor 101, the main memory unit 102, and the auxiliary memory unit 103 are analogous to the processor 301, the main memory unit 302, and the auxiliary memory unit 303 of the server apparatus 300. Accordingly, the description thereof is omitted. The display unit 104 is, for example, a liquid crystal display (LCD), an Electroluminescence (EL) panel or the like. The input unit 105 includes a touch panel, push buttons, etc. Furthermore, the input unit 105 may include a camera allowing videos and images to be input, or an audio input unit, such as a microphone. The communication unit 106 is, for example, a communication circuit for accessing the network N1 using a mobile communication service (a telephone communication network, such as of mobile phones, or wireless communication, such as WiFi) and for communicating with the server apparatus 300 and the like.

Next, the second user terminal 200 is described. As with the first user terminal 100, the second user terminal 200 includes a processor 201, a main memory unit 202, an auxiliary memory unit 203, a display unit 204, an input unit 205, and a communication unit 206. The processor 201, the main memory unit 202, the auxiliary memory unit 203, the display unit 204, the input unit 205, and the communication unit 206 are analogous respectively to the processor 101, the main memory unit 102, the auxiliary memory unit 103, the display unit 104, the input unit 105, and the communication unit 106 of the first user terminal 100. Accordingly, the description thereof is omitted. As with the first user terminal 100, the drive user terminal 400 also includes a processor 401, a main memory unit 402, an auxiliary memory unit 403, a display unit 404, an input unit 405, and a communication unit 406.

The network N1 is, for example, a worldwide public communication network, such as the Internet. A WAN (Wide Area Network) or another communication network may be adopted. The network N1 may include a telephone communication network such as of mobile phones, and a wireless communication network such as WiFi.

(Functional Configuration of Server Apparatus)

Figure 4:
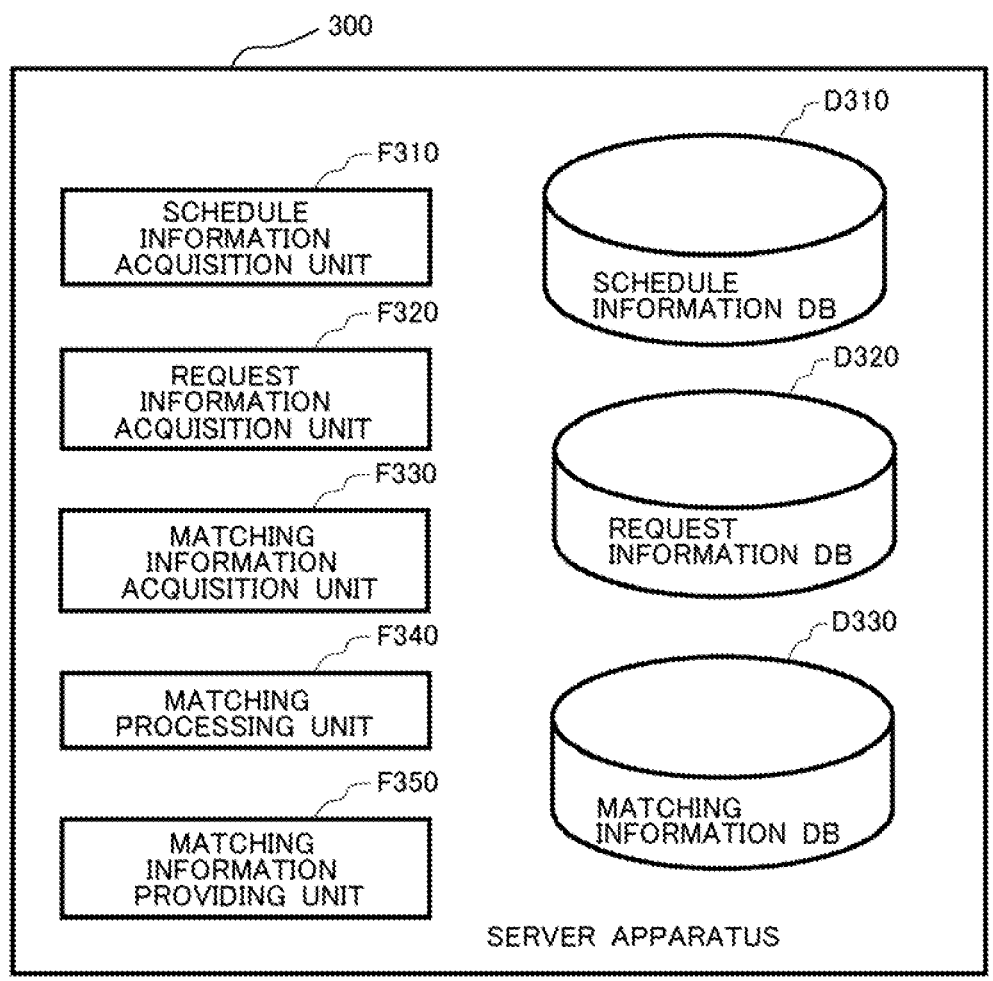
FIG. 4 is a diagram exemplifying a functional configuration of the server apparatus according to the first embodiment.

FIG. 4 is a diagram exemplifying a functional configuration of the server apparatus 300. The server apparatus 300 includes, as functional components: a schedule information acquisition unit F310; a request information acquisition unit F320; a matching information acquisition unit F330; a matching processing unit F340; a matching information providing unit F350; a schedule information database D310; a request information database D320; and a matching information database D330. The processor 301 of the server apparatus 300 causes a computer program on the main memory unit 302 to execute the processes of the schedule information acquisition unit F310, the request information acquisition unit F320, the matching information acquisition unit F330, the matching processing unit F340, and the matching information providing unit F350. Note that any of the functional components or a part of the process thereof may be executed by a hardware circuit.

The schedule information database D310, the request information database D320, and the matching information database D330 are constructed through management of data stored in the auxiliary memory unit 303, the management being performed by a program of a database management system (DBMS) executed by the processor 301. The schedule information database D310, the request information database D320, and the matching information database D330 are, for example, relational databases.

Note that any of the functional components of the server apparatus 300 or a part of the process thereof may be executed by another computer connected to the network N1. For example, the processes of the matching information acquisition unit F330 and the matching processing unit F340, and the processes of the schedule information acquisition unit F310, the request information acquisition unit F320 and the matching information providing unit F350 may be executed separately by different computers.

The schedule information acquisition unit F310 acquires the schedule information from the drive user driving the vehicle provided for rideshare. The schedule information includes a movement schedule of the vehicle used for rideshare. The schedule information acquisition unit F310 registers the schedule information in the schedule information database D310.

Here, the schedule information database D310 is a database that stores the schedule information. The schedule information database D310 includes a schedule information table depicted in FIG. 5. Note that information stored in the schedule information table is not limited to the example depicted in FIG. 5. A field can be appropriately added, changed and removed.

The schedule information table depicted in FIG. 5 includes the fields of the user ID (drive user ID), vehicle number, departure point, scheduled departure time and destination point. The drive user ID is the ID for identifying the drive user, and is preliminarily associated with the identification information (vehicle number) on the vehicle in the server apparatus 300. Rideshare user information that includes the user ID is managed by an individual table. The table includes the user's contact destination and the like. The contact destination is, for example, the user's mobile phone number or email address.

In the example depicted in FIG. 5, a drive user S001 causes the vehicle to depart the departure point d at 18:00, and moves the vehicle toward the destination point e. A drive user S002 causes the vehicle to depart the departure point d at 18:10, and moves the vehicle toward the destination point e.

Here, returning to the description of FIG. 4. The request information acquisition unit F320 acquires the request information from the user. The request information includes not only the departure point and the destination point of the user, but also information on whether or not to permit a user other than the drive user to ride in the vehicle where the user is scheduled to ride (hereinafter, permissibility information). The request information acquisition unit F320 registers the request information in the request information database D320.

The request information database D320 is a database that stores the request information. The request information database D320 includes a request information table depicted in FIG. 6. Note that information stored in the request information table is not limited to the example depicted in FIG. 6. A field can be appropriately added, changed and removed.

The request information table depicted in FIG. 6 includes the fields of the user ID (passenger user ID), departure point, desired departure time, destination point, desired arrival time, ride permissibility of another user (permissibility information). In the example depicted in FIG. 6, a passenger user C001 desires to depart a departure point f at 18:00 and reach a destination point g at 18:50. A passenger user C002 desires to depart a departure point h at 18:30 and reach the destination point g at 18:50. Both the passenger users C001 and C002 permit another user (this user is not a drive user) to ride in the vehicle where they ride.

Note that the user inputs the schedule information or the request information into the user terminal (e.g., the first user terminal 100, the second user terminal 200, or the drive user terminal 400), thereby transmitting the information from the user terminal to the server apparatus 300. In detail, the first user terminal 100 and the second user terminal 200 have a functional configuration of accepting input of the request information and transmitting the input information to the server apparatus 300. The processor 101 of the first user terminal 100 causes a computer program on the main memory unit 102 to execute a process of transmitting the request information input from the input unit 105, to the server apparatus 300 via the communication unit 106. The processor 201 of the second user terminal 200 causes a computer program on the main memory unit 202 to execute a process of transmitting the request information input from the input unit 205, to the server apparatus 300 via the communication unit 206. The drive user terminal 400 has a functional configuration of accepting input of the schedule information and transmitting the input information to the server apparatus 300. The processor 401 of the drive user terminal 400 causes a computer program on the main memory unit 402 to execute a process of transmitting the schedule information input from the input unit 405, to the server apparatus 300 via the communication unit 406. The schedule information acquisition unit F310 and the request information acquisition unit F320 acquire the information transmitted from the user terminal.

Here, returning to the description of FIG. 4. The matching processing unit F340 sets a combination of the user and the vehicle. That is, this unit matches the user and the vehicle with each other. First, matching in a case where the permissibility information described above permits another user to ride together is herein described using the example depicted in FIGS. 5 and 6 described above. In this case, the matching processing unit F340 can match the user and the vehicle with each other using a publicly known technique on the basis of the schedule information and the request information. It is herein assumed that as a result of the matching, the vehicle that the drive user S001 drives is matched with the passenger users C001 and C002.

After the matching processing unit F340 completes the matching between the user and the vehicle, this unit generates the matching information and registers the information in the matching information database D330.

Here, the matching information database D330 is a database that stores the matching information. The matching information database D330 includes a matching information table depicted in FIG. 7. Note that information stored in the matching information table is not limited to the example depicted in FIG. 7. A field can be appropriately added, changed and removed.

The matching information table depicted in FIG. 7 includes the fields of the drive user ID, the passenger user ID, the vehicle number, the drive user departure point and scheduled departure time thereof, the passenger user departure point and scheduled departure time thereof, the passenger user destination point, and the drive user destination point. In this example, as described above, the drive user S001 (i.e., the vehicle driven by S001) is matched with the passenger users C001 and C002. Note that the drive user S002 (i.e., the vehicle driven by S002) is matched with no passenger user.

Such matching information is provided by the matching information providing unit F350 depicted in FIG. 4 for the drive user and the passenger users. Here, according to a certain result of the matching process, the passenger user scheduled departure time (this is indicated in the matching information table in FIG. 7, for example) is sometimes set to be different from the scheduled departure time desired by the passenger user (this is indicated in the request information table in FIG. 6, for example). Accordingly, the matching information providing unit F350 may request each of the users (the drive user and the passenger users) to approve the matching information. In this case, the matching information table is registered as information where the matching information is determined after approval of the user.

Next, matching in a case where the permissibility information described above does not permit another user to ride together is described. When the permissibility information does not permit another user to ride together, the matching processing unit F340 regards, as the first vehicle, a vehicle with which the second user is not matched, and matches the first vehicle with the first user.

In detail, to match the user with the vehicle on the basis of the schedule information and the request information, first, the matching processing unit F340 acquires the permissibility information included in the request information. Here, the request information by the user who does not permit another user (this user is not the drive user) to ride in the vehicle where the original user is scheduled to ride is depicted in FIG. 8. A passenger user C003 depicted in FIG. 8 is a user who does not permit another user to ride in the vehicle where the user C003 is scheduled to ride, and desired to depart the departure point f at 18:10 and reach the destination point g at 18:50. Note that the passenger user C003 is hereinafter called "first user C003." The vehicle where the first user C003 rides is hereinafter called "first vehicle."

In the case where the first user C003 requests a ride in the first vehicle and does not permit users other than the drive user to ride, the matching information acquisition unit F330 acquires the matching information registered in the matching information database D330. As depicted in above FIG. 7, the matching information is information that indicates whether for each of the vehicles provided for rideshare, the passenger user requesting a ride in the vehicle, i.e., the second user, is matched with the vehicle or not. That is, the matching information acquisition unit F330 acquires the matching information, thereby acquiring whether or not the second user is matched with each of the vehicles provided for rideshare.

The matching processing unit F340 regards, as the first vehicle, the vehicle with which the second user is not matched, and matches the vehicle with the first user, on the basis of the schedule information, the request information, and combination information between the already matched second user and the vehicle.

FIG. 9 is an example of the matching information table that indicates the matching result between the first user C003 and the first vehicle. In this example, the vehicle that the drive user S002 depicted in FIG. 7 drives and that is a vehicle with which the second user is not matched, is matched as the first vehicle with the first user C003.

After the matching result depicted in FIG. 9 is determined (for example, matching between the first user C003 and the first vehicle is approved by the drive user S002 and the first user C003), the matching processing unit F340 does not permit another user to be matched with the first vehicle.

Note that the processor 301 executes the processes of the request information acquisition unit F320, the matching information acquisition unit F330, and the matching processing unit F340, thereby functioning as a controller according to the present disclosure. The server apparatus 300 then functions as an information processing apparatus according to the present disclosure.

Accordingly, in a process of movement of the first user C003 by the first vehicle, a situation does not occur where the first user C003 shares the vehicle space with users other than the drive user of the vehicle. Accordingly, a user hesitating to share the vehicle space is facilitated to use the rideshare.

(Flow of Processes)

Figure 10A:
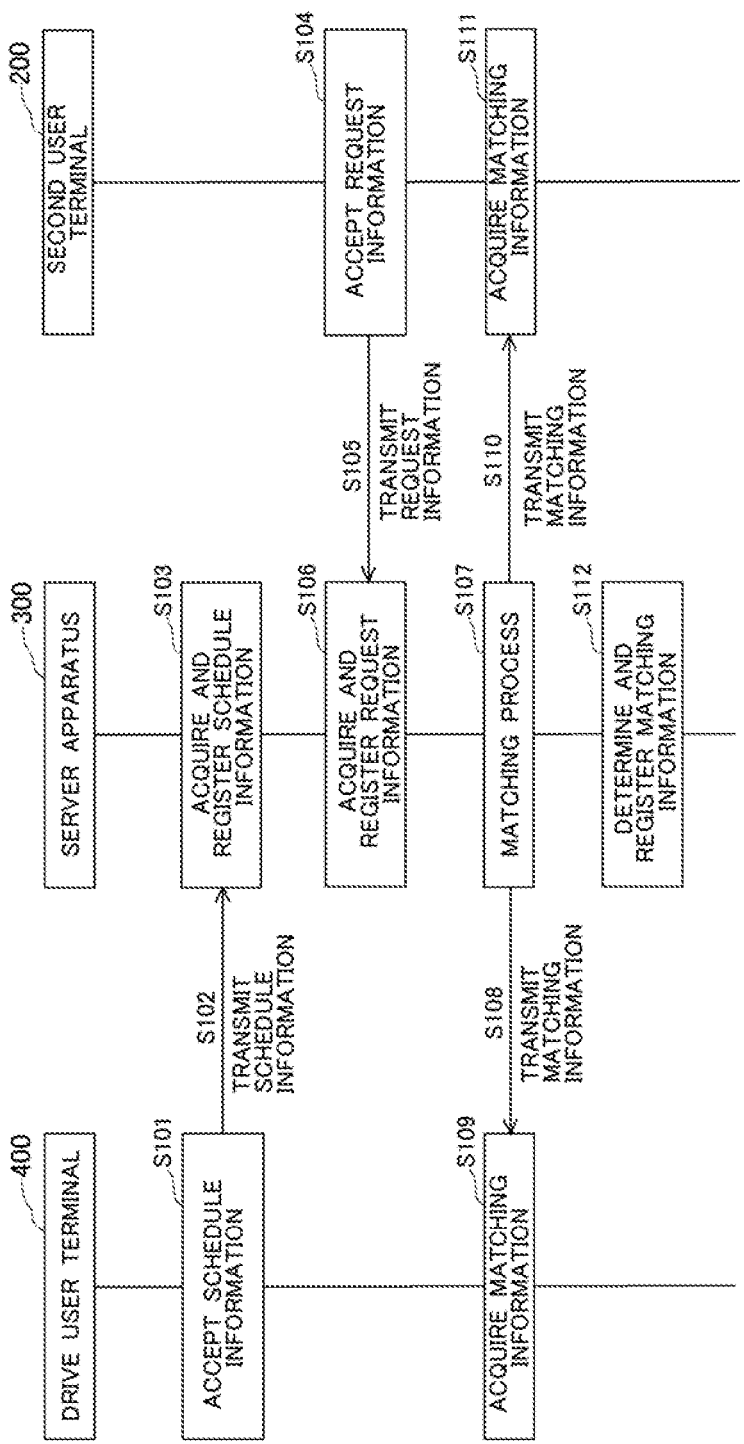
FIG. 10A is a first diagram exemplifying a flow of an operation of the matching system according to the first embodiment.
Figure 10B:
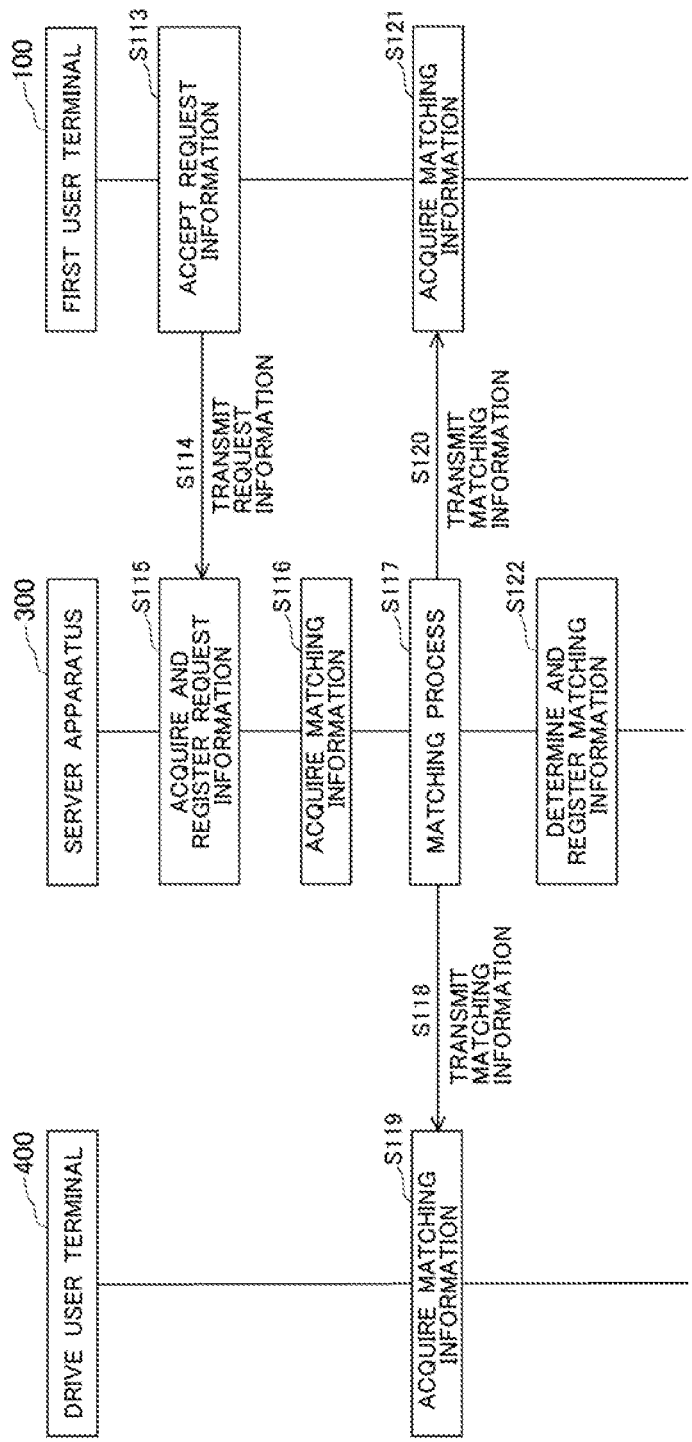
FIG. 10B is a second diagram exemplifying a flow of an operation of the matching system according to the first embodiment.

The flow of operation of the matching system according to this embodiment is described. FIGS. 10A and 10B are diagrams exemplifying the flows of operation of the matching system according to this embodiment. FIGS. 10A and 10B illustrate the flows of operation between the components, and the process executed by each component, in the matching system 1.

Here, in the matching system 1 depicted in FIG. 2, it is assumed that the first user rides in the vehicle 10, and the second user rides in the vehicle 20. The first user in this case is, for example, the passenger user C003 described above, and the second user is, for example, the passenger users C001 and C002 described above.

In this embodiment, first, the schedule information is registered by the drive user. The drive user terminal 400 accepts the schedule information from the drive user (S101), and transmits the information to the server apparatus 300 (S102). The server apparatus 300 then acquires the schedule information transmitted from the drive user terminal 400, through reception by the communication unit 304, and registers the schedule information in the schedule information database D310 (S103).

Next, the request information is registered by the passenger users C001 and C002. The second user terminal 200 accepts the request information from the passenger users C001 and C002 (S104), and transmits the information to the server apparatus 300 (S105). The server apparatus 300 then acquires the request information transmitted from the second user terminal 200, through reception by the communication unit 304, and registers the request information in the request information database D320 (S106). Here, the request information includes the permissibility information described above. Both the passenger users C001 and C002 permit another user (this user is not a drive user) to ride in the vehicle where they ride.

The server apparatus 300 performs the matching process on the basis of the schedule information and the request information (S107). In this case, the permissibility information permits another user to ride together. Accordingly, the matching processing unit F340 of the server apparatus 300 matches the passenger users C001 and C002 with the vehicle 20 using the publicly known technique as described above. After the matching process is completed, the server apparatus 300 transmits the matching information to the drive user terminal 400 owned by the drive user of the vehicle 20 and to the second user terminal 200 owned by the passenger users C001 and C002 (S108 and S110).

The drive user terminal 400 and the second user terminal 200 acquire the matching information transmitted from the server apparatus 300 (S109 and S111). Here, the drive user having acquired the matching information through the drive user terminal 400 and the second user having acquired the matching information through the second user terminal 200 can approve the matching result by the process in S107.

After the matching is approved by the drive user and the second user, the server apparatus 300 determines the matching information, and registers the matching information in the matching information database D330 (S112).

According to the processes described above, the passenger users C001 and C002 are matched, as the second users, with the vehicle 20.

In this embodiment, the request information is registered by the first user C003 in the server apparatus 300 where the matching information has thus been registered. The first user terminal 100 accepts the request information from the first user C003 (S113), and transmits the information to the server apparatus 300 (S114). The server apparatus 300 then acquires the request information transmitted from the first user terminal 100, through reception by the communication unit 304, and registers the request information in the request information database D320 (S115). Here, the request information includes the permissibility information described above. The first user C003 does not permit another user (this user is not a drive user) to ride in the first vehicle where the user C003 rides. That is, the process in S115 is a step of acquiring whether or not the first user permits another user who is not the drive user of the first vehicle to ride.

As described above, when the permissibility information does not permit another user to ride, the server apparatus 300 acquires the matching information registered in the matching information database D330 (S116). The matching information acquisition unit F330 of the server apparatus 300 acquires the matching information, thereby acquiring whether or not the second user is matched with each of the vehicles provided for rideshare.

The server apparatus 300 then performs the matching process on the basis of the schedule information, the request information, and the combination information between the already matched second user and the vehicle (S117). The matching processing unit F340 of the server apparatus 300 regards the vehicle 10 with which the second user is not matched, as the first vehicle, and combines the vehicle 10 with the first user. After the matching process is completed, the server apparatus 300 transmits the matching information to the drive user terminal 400 owned by the drive user of the vehicle 10 and to the first user terminal 100 owned by the first user C003 (S118 and S120).

The drive user terminal 400 and the first user terminal 100 acquire the matching information transmitted from the server apparatus 300 (S119 and S121). Here, the drive user having acquired the matching information through the drive user terminal 400 and the first user having acquired the matching information through the first user terminal 100 can approve the matching result by the process in S117.

After the matching is approved by the drive user and the first user, the server apparatus 300 determines the matching information, and registers the matching information in the matching information database D330 (S122). After the matching between the first user and the vehicle 10 is determined, the server apparatus 300 does not permit another user to be matched with the vehicle 10. Accordingly, in a process of movement of the first user by the vehicle 10, a situation does not occur where the first user shares the vehicle space with users other than the drive user of the vehicle 10.

According to the matching system described above, the user hesitating to share the vehicle space is facilitated to use the rideshare. That is, the information processing apparatus according to the present disclosure can provide the user-friendly traffic mode.

Note that the aforementioned matching system 1 depicted in FIGS. 10A and 10B includes the drive user terminal 400, which is a terminal owned by the drive user driving the vehicle. However, there is no intention of limitation thereto. For example, the vehicle may be an autonomous mobile body that autonomously moves on the basis of a predetermined operation instruction. In this case, there is no drive user. Accordingly, the server apparatus 300 acquires the drive schedule of the vehicle (schedule information) from a predetermined operation management server.

The first user may be a group of users who desire to ride in the same vehicle 10. For example, in a case where the users constituting the first users are friends, the first users do not hesitate to share the vehicle space of the vehicle 10, but sometimes hesitate to ride with a user other than the first users. Accordingly, the matching process is performed as described above, thereby facilitating use of rideshare for the first users made up of multiple users.

In a traffic mode such as rideshare, besides the mode where multiple users ride in the vehicle together, a mode can be considered where one user rides in a vehicle and move while another user uses the vehicle to transport a package. In such a case, the package of the other user is placed in the vehicle space of the first vehicle where the first user rides. Accordingly, a situation where the first user hesitates to use rideshare is unlikely to occur. Consequently, even though the first user does not permit another user to ride in the first vehicle, the server apparatus 300 according to this embodiment may match the first vehicle where the first user rides, with the package that the other user desires to transport.

(Recording Medium)

A program that allows a computer, another machine or an apparatus (hereinafter a computer or the like) to achieve any of the functions described above can be recorded in a recording medium that is readable by the computer or the like. The computer or the like is caused to read and perform the program in the recording medium, thereby enabling the function to be provided.

Here, the recording medium that is readable by the computer or the like is a non-transitory recording medium that can accumulate information, such as data or programs, through an electric, a magnetic, an optical, a mechanical or a chemical action, and read it from the computer or the like. What is detachable from the computer or the like among such recording media includes, for example, a flexible disk, magnetooptical disk, CD-ROM, CD-R/W, DVD, Blu-ray disk, DAT, 8 mm tape, and a memory card, such as a flash memory. Furthermore, there is a hard disk, ROM (read only memory) and the like as recording media fixed to the computer or the like. Moreover, an SSD (Solid State Drive) can be used as a recording medium detachable from the computer or the like and also as a recording medium fixed to the computer or the like.

Second Embodiment

Next, a second embodiment of the present disclosure is described. Note that in this embodiment, detailed description of components substantially identical to those in the aforementioned first embodiment and substantially identical control processes is omitted.

As described above, in the first embodiment, after the first user is matched with the vehicle 10, the server apparatus 300 does not permit another user to be matched with the vehicle 10. In this case, the vehicle 10 tends to have a user riding space other than the space that the first user occupies. Accordingly, if there is a user intends to move immediately using rideshare in a movement path along which the vehicle 10 moves with the first user being allowed to ride while leaving a space allowing a user to ride therein, a situation inconvenient for the drive user of the vehicle 10 and the first user can occur.

In this embodiment, the server apparatus 300 generates the movement path so that the movement path of the movement of the first user in the vehicle 10 does not include the scheduled boarding position of a rideshare customer user (hereinafter, sometimes simply called "customer user"). The server apparatus 300 then provides the generated movement path for the vehicle 10. This is described based on FIGS. 11 to 14.

Figure 11:
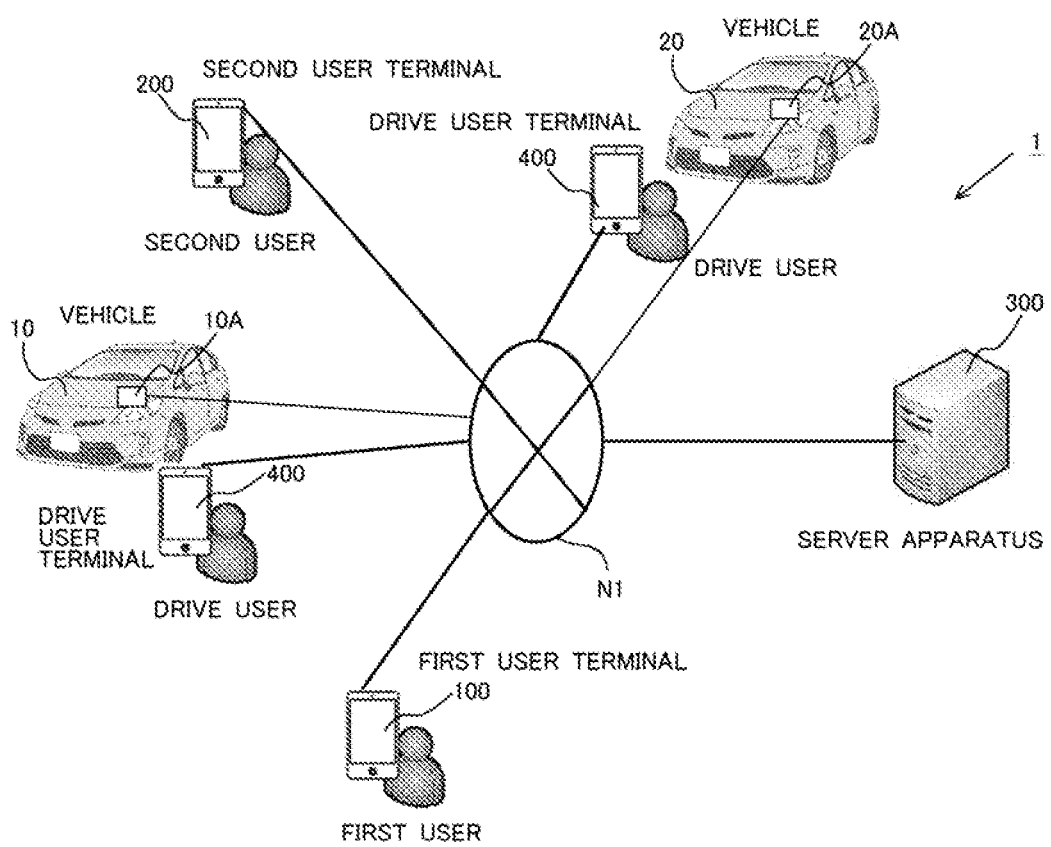
FIG. 11 is a diagram depicting the schematic configuration of a matching system according to a second embodiment.

FIG. 11 is a diagram depicting the schematic configuration of the matching system according to this embodiment. In the example in FIG. 11, the vehicle 10 and the vehicle 20 include a vehicle-mounted device 10A and a vehicle-mounted device 20A, respectively. These vehicle-mounted devices each include a communication unit connectable to the network N1, a GPS device, and a navigation system.

Figure 12:
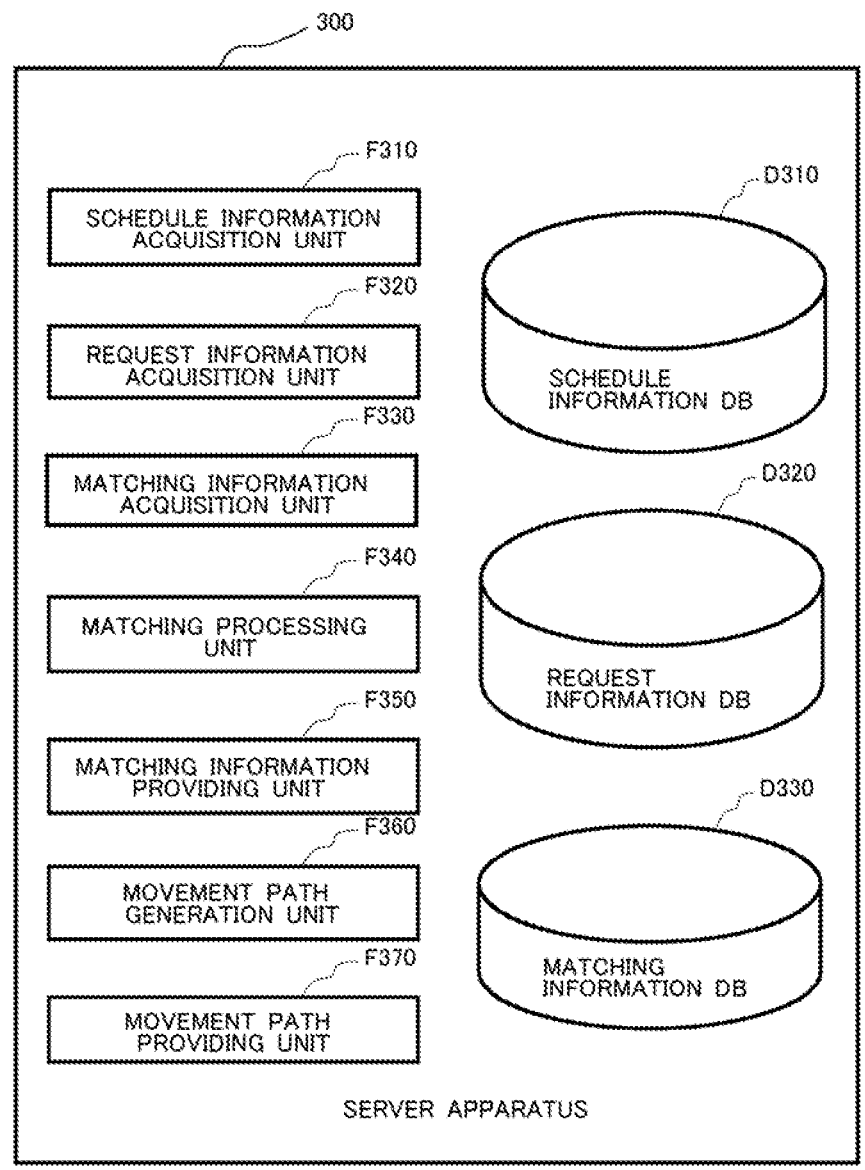
FIG. 12 is a diagram exemplifying a functional configuration of the server apparatus according to the second embodiment.

FIG. 12 is a diagram exemplifying the functional configuration of the server apparatus 300 according to this embodiment. The server apparatus 300 includes not only the functional components described in the first embodiment, but also a movement path generation unit F360 and a movement path providing unit F370. The processor 301 of the server apparatus 300 executes the processes of the movement path generation unit F360 and the movement path providing unit F370, through a computer program on the main memory unit 302. Note that any of the functional components or a part of the process thereof may be executed by a hardware circuit.

The movement path generation unit F360 generates the movement path of the movement of the first user in the vehicle 10 (hereinafter, simply called "movement path"). In detail, the movement path generation unit F360 acquires the departure point and the destination point of the first user from the matching information database D330. Based on a publicly known technique, the movement path is generated. Note that there is a possibility that the thus generated movement path includes the scheduled boarding position of the customer user. Here, the scheduled boarding position of the customer user according to this embodiment is a point at which the second user is scheduled to board the vehicle 20, and is a point registered as the passenger departure point (the departure point of the passenger users C001 and C002) in the matching information table described above with reference to FIG. 9.

When the scheduled boarding position of the second user is included in the movement path generated as described above, the movement path generation unit F360 regenerates the movement path again so that the movement path does not include the scheduled boarding position of the second user. Alternatively, when the movement path generation unit F360 generates the movement path at the first time, this unit generates the movement path so that the movement path does not include the scheduled boarding position of the second user, on the basis of the departure point and the destination point of the first user, and the scheduled boarding position of the second user acquired from the matching information database D330. This is described with reference to FIG. 13, exemplifying the movement path generated for the first user C003 in the matching information table depicted in FIG. 9 described above. The scheduled boarding position of the second user is acquired by the matching information acquisition unit F330.

Figure 13:
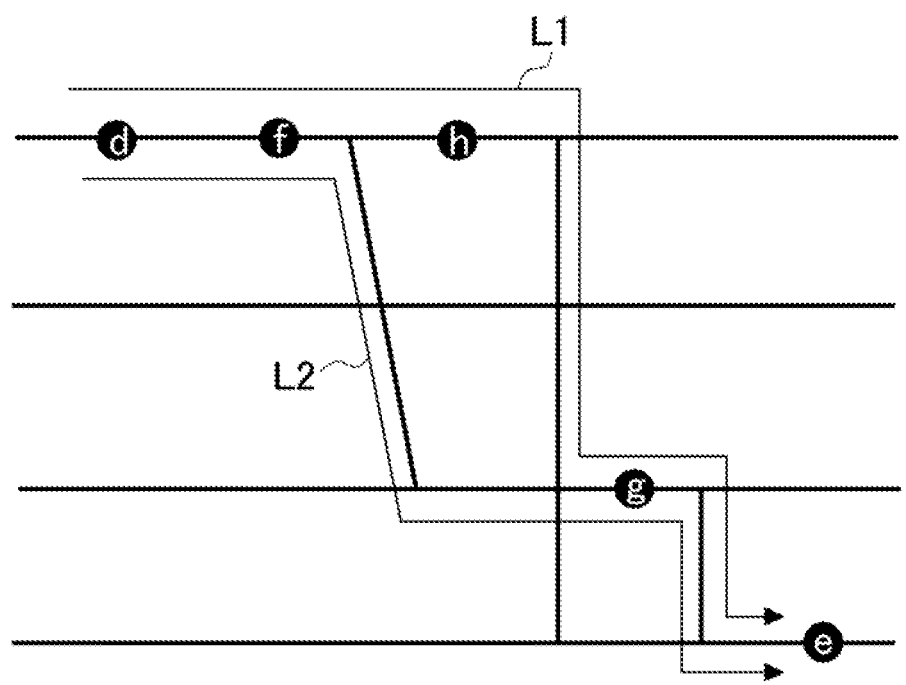
FIG. 13 is a diagram for illustrating a movement path of a first user in the second embodiment.

FIG. 13 is a diagram for illustrating a route of the vehicle 20 where the second users C001 and C002 ride in the matching information table depicted in FIG. 9 described above, and a route of the vehicle 10 where the first user C003 rides.

Here, the drive user S001 moves the vehicle 20 from a point d to a point e. Here, the drive user S001 allows the second user C001 to board the vehicle 20 at a point f, and allows the second user C002 to board the vehicle 20 at a point h. The drive user S001 allows the second users C001 and C002 to get off the vehicle 20 at a point g. Such a route of the vehicle 20 is represented as a route L1 in FIG. 13.

The drive user S002 moves the vehicle 10 from the point d to the point e. Here, the drive user S001 allows the first user C003 to board the vehicle 10 at the point f, and allows the first user C003 to get off the vehicle 10 at the point g. Here, according to FIG. 9, the second user C001 is scheduled to board the vehicle 20 at the point f at 18:10. Meanwhile, the drive user S002 is scheduled to start the vehicle 10 from the point d at 18:10. Accordingly, when the vehicle 10 reaches the point f, it is estimated that the second user C001 has already been in the vehicle 20. Accordingly, in the movement of the first user C003 in the vehicle 10, the point f is not the scheduled boarding position of the second user.

Meanwhile, the second user C002 is scheduled to board the vehicle 20 at the point h at 18:30. Accordingly, if the vehicle 10 departs the point f at 18:20 and moves along the route L1, a situation can occur where the vehicle 10 passes by the second user C002 while leaving a space where a user can ride. That is, a situation can occur where the vehicle 10 passes by the scheduled boarding position h of the second user C002.

Accordingly, the movement path generation unit F360 generates a route L2 depicted in FIG. 13 as the movement path so that the movement path does not include the scheduled boarding position h of the second user C002. Accordingly, there is not another user using rideshare on the movement path of the first user. Consequently, the situation inconvenient for the drive user of the vehicle 10 and the first user does not occur.

The movement path generated as described above is provided for the vehicle 10 by the movement path providing unit F370 depicted in FIG. 12. In this embodiment, the server apparatus 300 transmits the movement path to the vehicle-mounted device 10A of the vehicle 10, thus providing the movement path for the vehicle 10 (the drive user of the vehicle 10). However, there is no intention of limitation thereto. The server apparatus 300 may transmit the movement path to the drive user terminal 400 to thereby provide the movement path for the vehicle 10 (the drive user of the vehicle 10). Accordingly, the drive user can drive the vehicle 10 according to the provided movement path (the movement path is displayed on the screen of the navigation system included in the vehicle-mounted device 10A and the screen of the drive user terminal 400). If the vehicle 10 is an autonomous mobile body autonomously moving on the basis of a predetermined operation instruction, the server apparatus 300 transmits the movement path to the predetermined operation management server, thereby transmitting the movement path to the vehicle 10 via the operation management server.

The movement path providing unit F370 can transmit the movement path generated by the movement path generation unit F360 also to the first user terminal 100. In this case, the first user can acquire the movement path of this user via the first user terminal 100.

Note that the processor 301 executes the processes of the request information acquisition unit F320, the matching information acquisition unit F330, the matching processing unit F340, the movement path generation unit F360 and the movement path providing unit F370, thereby functioning as the controller according to the present disclosure.

Figure 14:
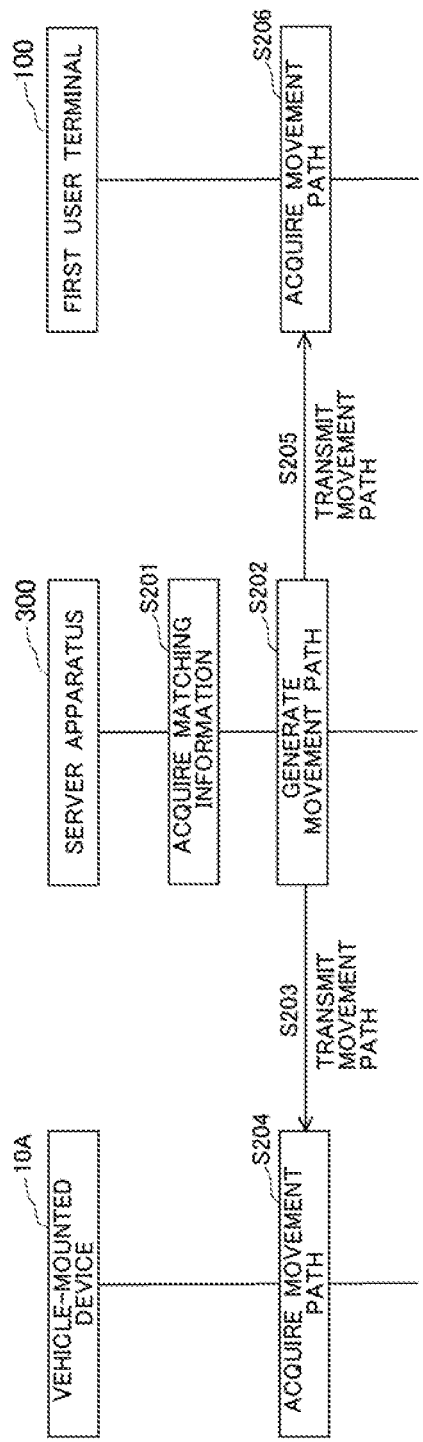
FIG. 14 is a diagram exemplifying a flow of an operation of the matching system according to the second embodiment.

Next, the flow of operation of the matching system according to this embodiment is described. FIG. 14 is a diagram exemplifying the flow of the operation of the matching system according to this embodiment. FIG. 14 illustrates the flow of operation between the components, and the process executed by each component, in the matching system 1. Note that each process depicted in FIG. 14 is executed after the matching between the first user and the vehicle 10 is determined by the process in S122 depicted in FIG. 10B described above.

In this embodiment, first, the server apparatus 300 acquires the matching information registered in the matching information database D330 (S201). The matching information acquisition unit F330 of the server apparatus 300 acquires the matching information, thereby acquiring the scheduled boarding position where the customer user is scheduled to board the vehicle provided for rideshare.

Next, the server apparatus 300 generates the movement path (S202). As described above, the server apparatus 300 generates the movement path so that the movement path does not include the scheduled boarding position of the customer user in the movement of the first user in the vehicle 10. In detail, the movement path generation unit F360 generates the movement path so that this movement path does not include the scheduled boarding position of the customer user, on the basis of the departure point and the destination point of the first user, and the scheduled boarding position of the customer user acquired from the matching information database D330.

The server apparatus 300 then transmits the movement path to the vehicle-mounted device 10A of the vehicle 10 and the first user terminal 100 (S203 and S205). That is, the generated movement path is provided for the vehicle 10 and the first user. The vehicle-mounted device 10A and the first user terminal 100 acquire the movement path transmitted from the server apparatus 300 (S204 and S206).

The matching system described above can also provide the user-friendly traffic mode.

Other Embodiments

The embodiments described above are only examples. The present disclosure can be appropriately changed and executed in a scope without departing from the gist.

The processes and means described in this disclosure can be freely combined and executed unless a technical contradiction occurs.

The process described as what is performed by a single device may be shared among multiple devices and executed. Alternatively, the processes described as what is performed by different devices may be executed by a single device. In a computer system, a hardware configuration (server configuration) that executes each function can be flexibly changed.

The present disclosure can be also achieved by providing a computer with a computer program where the functions described in the embodiments are implemented, and by causing one or more processors included in the computer to read and execute the program. Such a computer program may be provided for the computer through a non-transitory computer readable storage medium connectable to a system bus of the computer, or provided for the computer via a network. The non-transitory computer readable storage medium may be, for example, any type of disk, such as a magnetic disk (floppy (R) disk, hard disk drive (HDD), etc.) or an optical disk (CD-ROM, DVD disk, Blu-ray disk, etc.), or a read only memory (ROM), a random access memory (RAM), EPROM, EEPROM, a magnetic card, a flash memory or an optical card, or any type of medium suitable for storing electronic instructions.

What is claimed is:

1. An information processing apparatus comprising a controller configured to execute:
   receiving a request to ride share from a terminal of a first user, the request including user information, a destination location, and a permissibility information set by the first user indicating whether the first user permits to ride with another user;
   determining whether the first user permits another user to ride with the first user based on the permissibility information;
   determining a first vehicle for the first user to ride in based on the request and a vehicle database, and transmitting vehicle information of the first vehicle to the first user, including a pickup location; and
   in response to subsequently receiving a request to ride share from a terminal of a second user, not matching the second user with the first vehicle based on the permissibility information set by the first user that does not permit another user to ride in the first vehicle; and
   matching the first vehicle with a package that another user desires to transport, when the first user does not permit another user to ride the first vehicle.

2. The information processing apparatus according to claim 1, wherein the controller is further configured to execute:
   matching the second user with the first vehicle, when the first user permits another user to ride the first vehicle.

3. The information processing apparatus according to claim 1, wherein the controller is further configured to execute:
   regarding, as the first vehicle, a vehicle with which the second user is not matched, and matching the first vehicle with the first user, when the first user does not permit another user to ride the first vehicle.

4. An information processing method for causing a computer to perform:
   receiving a request to ride share from a terminal of a first user, the request including user information, a destination location, and a permissibility information set by the first user indicating whether the first user permits to ride with another user;
   determining whether the first user permits another user to ride with the first user based on the permissibility information;
   determining a first vehicle for the first user to ride in based on the request and a vehicle database, and transmitting vehicle information of the first vehicle to the first user, including a pickup location; and
   in response to subsequently receiving a request to ride share from a terminal of a second user, not matching the second user with the first vehicle based on the permissibility information set by the first user that does not permit another user to ride the first vehicle; and
   matching the first vehicle with a package that another user desires to transport, when the first user does not permit another user to ride the first vehicle.

5. A non-transitory computer readable storage medium storing a program for causing a computer to perform:
   receiving a request to ride share from a terminal of a first user, the request including user information, a destination location, and a permissibility information set by the first user indicating whether the first user permits to ride with another user;
   determining whether the first user permits another user to ride with the first user based on the permissibility information;
   determining a first vehicle for the first user to ride in based on the request and a vehicle database, and transmitting vehicle information of the first vehicle to the first user, including a pickup location; and
   in response to subsequently receiving a request to ride share from a terminal of a second user, not matching the second user with the first vehicle based on the permissibility information set by the first user that does not permit another user to ride the first vehicle; and matching the first vehicle with a package that another user desires to transport, when the first user does not permit another user to ride the first vehicle.

\* \* \* \* \*